United States Patent
Howard

(10) Patent No.: US 10,086,477 B2
(45) Date of Patent: Oct. 2, 2018

(54) FLUX-CORED BRAZING PREFORM

(71) Applicant: LINCOLN GLOBAL, INC., City of Industry, CA (US)

(72) Inventor: Robert A Howard, Goshen, OH (US)

(73) Assignee: Lincoln Global, Inc., City of Industry, CA (US)

( * ) Notice: Subject to any disclaimer, the term of this patent is extended or adjusted under 35 U.S.C. 154(b) by 744 days.

(21) Appl. No.: 14/551,596

(22) Filed: Nov. 24, 2014

(65) Prior Publication Data

US 2016/0144459 A1   May 26, 2016

(51) Int. Cl.
  *B23K 35/02* (2006.01)
  *B23K 35/00* (2006.01)
  *B23K 35/362* (2006.01)

(52) U.S. Cl.
  CPC ........ *B23K 35/0222* (2013.01); *B23K 35/001* (2013.01); *B23K 35/0227* (2013.01); *B23K 35/0266* (2013.01); *B23K 35/0272* (2013.01); *B23K 35/362* (2013.01)

(58) Field of Classification Search
  CPC ............ B23K 35/0222; B23K 35/0227; B23K 35/0266; B23K 35/0261; B23K 35/0277; B23K 2035/408; B23K 35/0272; B23K 35/362; B23K 35/406; B23K 35/02; B23K 35/0216; B23K 35/0255; B23K 35/0283; B23K 35/0294; B23K 35/40; B23K 35/404
  See application file for complete search history.

(56) References Cited

U.S. PATENT DOCUMENTS

| | | | | |
|---|---|---|---|---|
| 1,629,748 | A | * | 5/1927 | Stoody ................. B23K 35/406 219/145.22 |
| 2,148,182 | A | * | 2/1939 | Applegate .......... B23K 35/0277 219/137 R |
| 2,468,372 | A | * | 4/1949 | Landis ............... B23K 35/0255 219/137 R |
| 2,958,941 | A | * | 11/1960 | Goerg .................... B23K 1/203 228/224 |
| 3,491,934 | A | * | 1/1970 | Foote ....................... B23K 3/08 174/94 R |
| 3,515,846 | A | * | 6/1970 | Nakamura ......... B23K 35/0272 219/123 |
| 3,542,998 | A | * | 11/1970 | Huff ................... B23K 35/0266 219/145.22 |

(Continued)

FOREIGN PATENT DOCUMENTS

| | | | | |
|---|---|---|---|---|
| FR | 2 082 941 | * | 11/1971 | ............... B23K 9/00 |
| JP | 59-125291 | * | 7/1984 | ............. B23K 35/04 |

OTHER PUBLICATIONS

International Search Report and Opinion from PCT/IB2015002205 dated Apr. 25, 2016; 10 pages.

*Primary Examiner* — Michael P Ferguson
(74) *Attorney, Agent, or Firm* — Perkins Coie LLP

(57) ABSTRACT

Embodiments of the present invention are directed to flux-cored brazing consumables and preforms which have at least one protrusion which extends from an outer surface of the consumable such that the protrusion engages with a surface of a component to be brazed. The protrusion aids in securing the brazing consumable in position during manufacture, assembly and transport of an assembly to be brazed, prior to a brazing operation.

15 Claims, 4 Drawing Sheets

(56) References Cited

U.S. PATENT DOCUMENTS

| | | | | |
|---|---|---|---|---|
| 3,935,414 | A * | 1/1976 | Ballass | B23K 35/0266 |
| | | | | 148/24 |
| 4,379,811 | A * | 4/1983 | Puschner | B23K 35/0272 |
| | | | | 219/145.1 |
| 4,697,791 | A * | 10/1987 | Henderson | E21B 7/146 |
| | | | | 219/145.23 |
| 5,219,425 | A * | 6/1993 | Nishikawa | B23K 35/3608 |
| | | | | 219/145.22 |
| 6,830,632 | B1 | 12/2004 | Fuerstenau | |
| 7,858,204 | B2 * | 12/2010 | Campbell | B23K 35/40 |
| | | | | 428/358 |
| 8,740,041 | B2 * | 6/2014 | Visser | B23P 13/04 |
| | | | | 148/23 |
| 2010/0122997 | A1 * | 5/2010 | Liu | B23K 35/40 |
| | | | | 228/203 |
| 2011/0123824 | A1 * | 5/2011 | Belohlav | B23K 35/0238 |
| | | | | 428/650 |
| 2012/0006881 | A1 | 1/2012 | Fuersteanu | |
| 2014/0008417 | A1 * | 1/2014 | Visser | B23K 35/0222 |
| | | | | 228/56.3 |
| 2014/0021186 | A1 | 1/2014 | Denney | |
| 2014/0042144 | A1 | 2/2014 | Peters | |

\* cited by examiner

FLUX-CORED BRAZING PREFORM

TECHNICAL FIELD

Devices, systems, and methods consistent with the invention relate to brazing, and more specifically to devices, systems and methods related to the manufacture, structure and using of flux-cored brazing wire and brazing preforms.

BACKGROUND

Brazing typically involves joining at least two separate metal components together (which can be dissimilar metals) using a brazing composition and a flux between adjoining surface of the components. To join the surfaces the brazing alloy (often a silver alloy or aluminum alloy) and the flux are heated to a temperature above the melting temperature of the brazing alloy but below the melting temperature of the components to be joined. The brazing alloy then melts and flows in between the adjoining surfaces—via capillary action—and when it solidifies it holds the separate components together as one. Often a flux cored brazing consumable is used for brazing components, where the brazing flux is positioned in a core of the consumable and flows out of the consumable prior to the melting of the outer shell of the consumable, which is typically made of the brazing alloy. Further, often brazing consumables are formed into preform shapes, as opposed to simple straight rods or wound on spools/reels. These preform shapes allow for easy use in multiple applications, such as the fabrication of radiators, etc.

While the use of preform shapes improves the efficiency of some brazing operations, problems still exist with using known preform shapes. Specifically, known preform shapes typically have a circular or rectangular cross-section. Thus, when these preforms are placed around components to be brazed they have a tendency to dislocate or move if the components are moved prior to brazing. This causes manufacturing delay as the preforms have to be repositioned prior to a brazing operation.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is a brazing consumable and preform having a cross-section which is primarily circular, but also has at least one protrusion extending out of an outer surface of the consumable. The protrusion aids in securing the consumable in place during movement or transport of the component assembly prior to a brazing operation.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is generally directed to brazing consumables, including flux-cored brazing consumables, which are manufactured as preforms or as straight rods, or other shapes. Further, embodiments of the present invention are not limited to the material and composition of either the sheath or the flux of the brazing consumables. Specifically, embodiments of the present invention can be used with any known brazing consumable materials, such as silver, aluminum, etc. Additionally, the general use and manufacture of brazing consumables and preforms is well known, and as such the details of such are not discussed herein.

Figure 1:
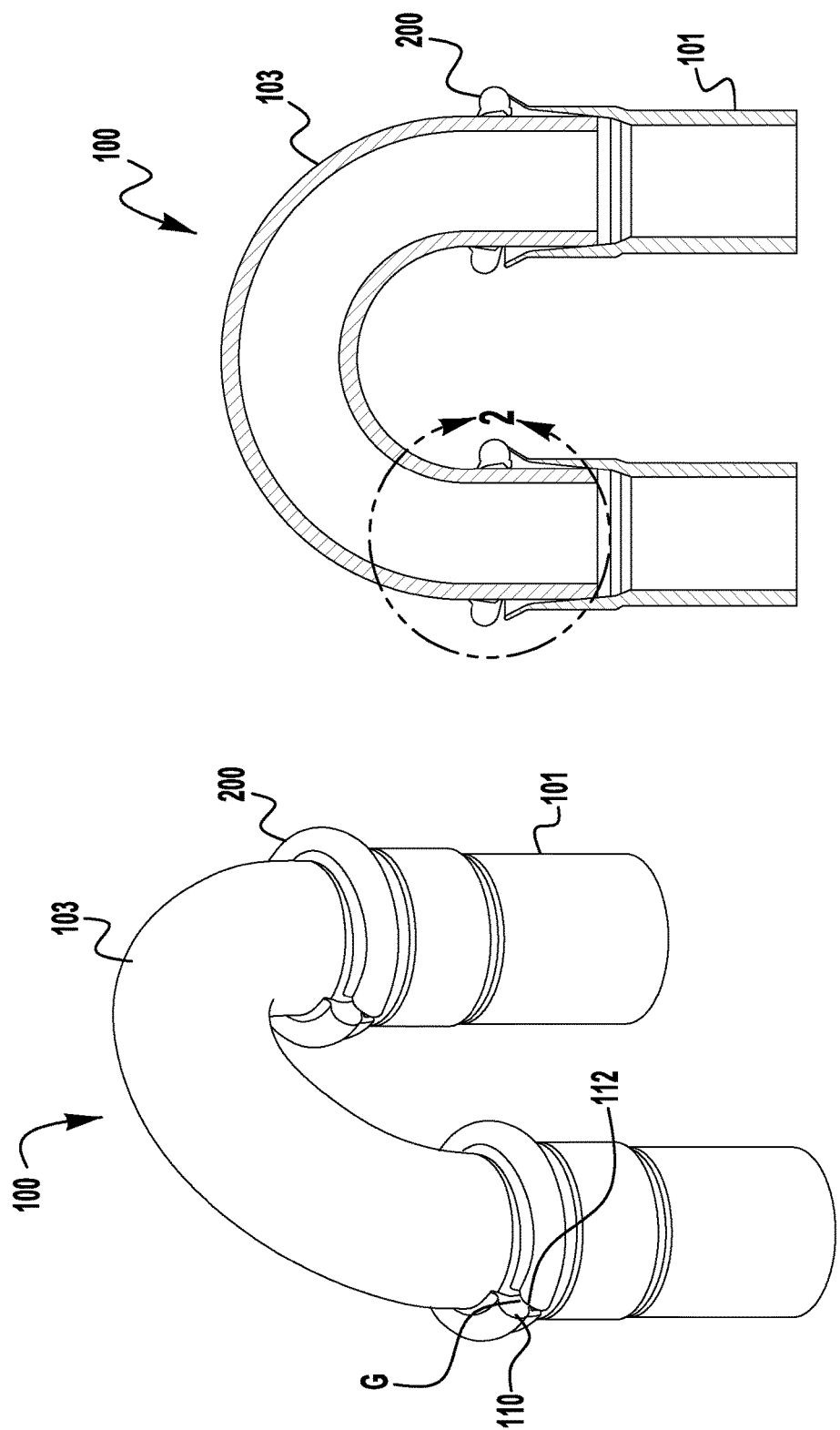
FIG. 1 is a diagrammatical representation of a component assembly using a preform in accordance with an exemplary embodiment of the present invention.

Turning now to FIG. 1, which shows a component assembly 100 that can be used with exemplary embodiments of the present invention. The component assembly 100 in FIG. 1 is an exemplary radiator/heat exchanger structure having a turn portion 103 and a pipe portion 101. As shown, the turn portion 103 is used to couple two pipe portions 101 with each other, where the turn portion 103 is inserted into a flange portion of the pipe portions 101. During manufacture the turn portion 103 is brazed to the pipe portions 101 to make a hermetically sealed tube. To do this, a brazing consumable, such as a preform 200, is often used. However, in many instances the turn portion 103 and the preforms 200 are assembled (having the preform(s) prepositioned on the turn portion 103) at a first location and then this assembly is shipped to another location, where the turn portions 103 (with the preforms 200) are assembled with the pipe portions 101 (for example in a heat exchanger structure) and the brazing of the components is completed at the second location. That is, at a first location the turn portion 103 and the preform(s) 200 are assembled to create the preassembled components. However, the components (103 and 200) are not brazed immediately and are shipped to a second location for the brazing operation—which can be done manually or via ovens, etc. At this second location the assembly (103 and 200) are joined with the pipes 101 (or other similar structures) so that a heat exchange/radiator can be assembled and brazed. With known preform constructions, the components of the assembly 103/200 can become dislodged or moved such that at the second location the components (e.g., preform 200) will need to be reassembled. This slows the manufacture of the assembly 100, and can increase the risk of the damage of the assembly components during shipment. However, with brazing consumables according to exemplary embodiments of the present invention, these issues are significantly mitigated—as will be explained further below.

Of course, it should be noted that the assembly 100 shown in FIG. 1 and generally discussed herein is intended to be exemplary of the many uses of embodiments of the present invention and is not intended to be limited in any way.

As shown in FIG. 1, in exemplary embodiments of the present invention the brazing preform 200 is pre-formed into a shape that is desired for a given brazing operation. That is, as shown, the preform 200 is formed in a general ring shape such that the preform 200 encircles nearly the entire circumference of the pipe components 101/103 at the joint. Of course, other preform shapes can be used depending on the intended application of the preform 200 and the shape of the components to be brazed. Embodiments of the present invention are not limited in this regard. The brazing consumable that is formed into the preforms 200 can be manufactured as a straight rod type consumable. For use in the assemblies discussed above, the brazing consumable is cut to a determined length and then formed so that it fits the work piece to brazed. In the examples shown, the brazing consumable is formed into a ring so as to create the preforms 200 that are used to go around the circular cross-section of the work piece 103. Further, depending on the application of the preforms 200 a gap G can be left between ends of the preform 200 to allow for easy installation or use of the preform 200. In other exemplary embodiments the ends of the preform 200 can be touching when the preform 200 is installed. Additionally, in exemplary embodiments the preform 200 is formed in a pre-determined shape (such as the ring shown in FIG. 1) such that the respective ends of the preform 200 are coplanar. That is, the preform 200 is formed such that it would lay flat on a flat surface. However, in other exemplary embodiments, and as shown in FIG. 1, the preform 200 can have a no-planar form where one end 110 of the preform 200 is higher than the other end 112 of the preform. In exemplary embodiments where the preform 200 is in a ring shape (such as in FIG. 1), the preform 200 can have a helical shape to create this divergence in the ends of the preform 200.

Figure 2A:
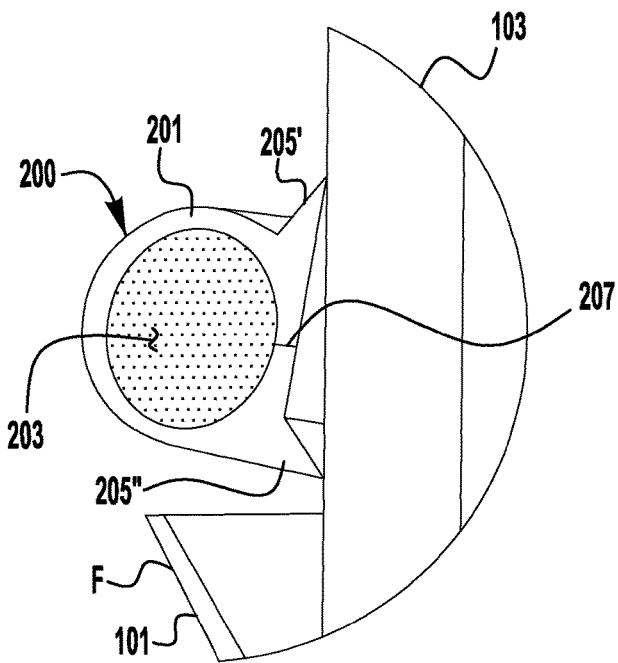
FIGS. 2A, 2B and 2C are diagrammatical representations of a cross-section of the consumable shown in FIG. 1.
Figure 2B:
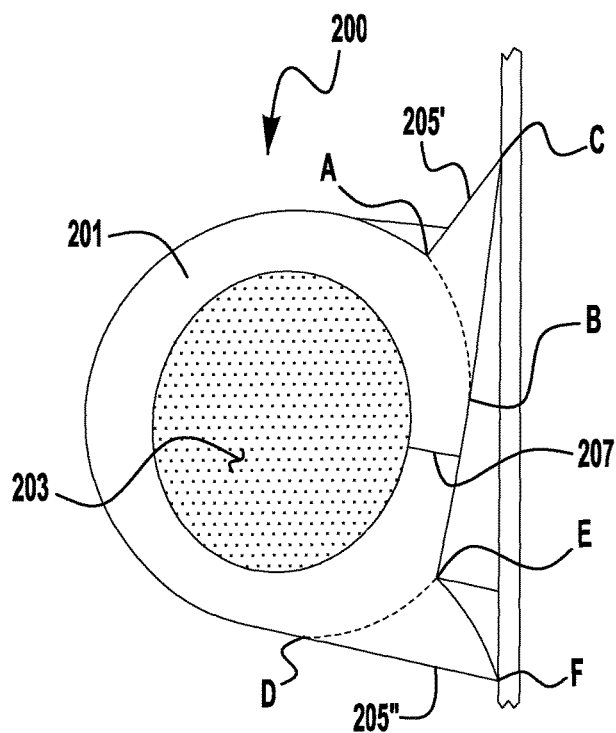
Figure 2C:
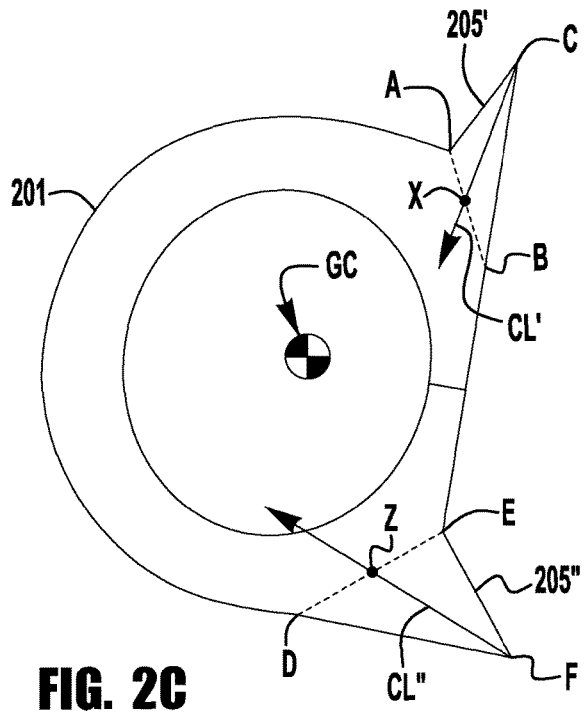

FIGS. 2A, 2B and 2C depict a cross-section view of the preform 200 shown in FIG. 1. As described above, the turn portion 103 of the assembly 100 is inserted into a flange F of the pipe portion 101. The preform 200 is placed around the turn portion 103 and is placed adjacent the flange F, as shown. In some exemplary embodiments, the flange F and the preform 200 are shaped such that at least a portion of the preform 200 can be inserted into the area of the flange F between the pipe portion 101 and the turn portion 103. As shown, the preform 200 has a cross-sectional shape which secures the preform 200 into position in the assembly 100 so that the movement of the preform 200 is inhibited during transport—but prior to brazing.

As shown, the preform 200 has a cross-section where the majority of the exterior shape of the preform 200 is circular, but the preform 200 also has at least one triangular projection 205 from the outer surface of the preform 200 which engages with at least one of the components to be brazed. This triangular projection(s) 205 aid in securing the preform 200 against a surface of the assembly or components to be brazed such that if the assembly is moved or jostled before brazing the preform 200 is maintained in a consistent position. This greatly optimizes the manufacturing process of components assemblies that are to be brazed. In exemplary embodiments, the preform 200 is a flux cored preform, which has a solid metal sheath 201 and a flux core 203. The sheath 201 can be made of any known brazing alloy which is known to be used for brazing operations. For example, the sheath can be made of a silver or aluminum brazing alloy. Of course, other materials can also be used. Further, the flux core 203 can be made up of any known flux material that is known to be used for brazing consumables. For example, the flux core can be any known flux powder or flux composition. The preform 200 also has a seam 207 in the sheath 201 where two ends of the sheath 201 are adjacent to each other to create the seam 207.

In some embodiments the seam 207 is made such that the respective ends of the sheath 201 are in contact with each other, while in other embodiments a small gap can be present at the seam 207. The gap 207 should be small enough to prevent the flux core 203 from passing through until the brazing/heating process. Further, the preform 200 is constructed that the seam 207 is adjacent to at least one of the components to be brazed. As shown in FIGS. 2A and 2B the seam 207 is adjacent the side wall of the turn portion 103. Thus, during brazing, the heated flux will flow out of the seam 207 and make contact with the components to allow for the proper distribution of the flux. In the exemplary embodiments shown the seam 207 is shown to be a butt-type seam. However, embodiments are not limited in this way and other exemplary embodiments of the can use a lap seam at the seam 207. That is, in such embodiments one end of the sheath 201 overlays the opposing end of the sheath 201 at the seam 207 so as to create a lap joint seam.

Further, as shown, while the exterior of the sheath 201 has protrusions 205 the flux core 203 has a generally circular cross-section. This ensures that the flux in the core 203 flows evenly out of the core 203. In some embodiments, if there were sharp corners or cavities within the shape of the core 203 (inner surface of the sheath 201) the flow of the flux can be compromised or uneven.

The embodiment of the preform 200 shown in FIGS. 2A and 2B has two triangular projections 205' and 205". Each of the projections 205'/205" are configured such that they contact the same assembly component (103) to engage the preform 200 with the component 103. That is, the projections 205'/205" have an edge which prevent the sliding of movement of the preform along the length of the component (e.g., turn portion 103) against which it is secured. As shown, in exemplary embodiments the protrusion portions 205' and 205" are located on the sheath 201 such that they are positioned remotely from the seam 207 of the sheath 207 when the consumable is formed. This is shown in FIGS. 2A and 2B.

As shown, the projections 205' and 205" have a generally triangular shape, while the majority of the cross-section of the preform 200 has a generally circular cross-section. That is, from point A to D the outer shape of the preform 200 is generally circular. That is, the outer surface of the preform 200 can be out-of-round, or not perfectly circular (e.g., elliptical, oval, etc.) either intentionally or due to manufacturing limitations of the preform. In some embodiments, the majority of the outer surface of the preform 200 (forming the overall cross-section) can be circular, except for the protrusions portions as described herein. In some exemplary embodiments, the outer generally circular portion of the cross-section represents at least 50% of the overall outer perimeter of the cross-section. In other exemplary embodiments, the outer generally circular portion in the range of 50 to 95% of the outer perimeter of the cross-section of the preform 200. In other exemplary embodiments, the outer circular portion of the cross-section is in the range of 65 to 90% of the outer perimeter of the cross-section of the preform 200. Further, in some exemplary embodiments, in between the triangular protrusions 205' and 205" the outer surface of the sheath is relatively flat and does not have a curved or arced shape. That is, between the points B and E, the outer surface of the sheath 201 is relatively flat. In other embodiments, between the points B and E the outer surface can be curved and can have the same radius of curvature as the generally circular portion of the sheath 201 (e.g., between points A and D).

As discussed above, the protrusions 205' and 205" are generally triangular shaped. As shown in FIG. 2B, the protrusion 205' is a triangular shape having end points A, B and C, and the protrusion 205" is a triangular shape having end points D, E and F. Each of the end points A, B, E and D, respectively are represented by points at which the projection sidewalls of the protrusions intersect with the outer surface of the sheath 201. For example, the end point A is the point at which the line A-C intersects with the generally circular outer surface of the sheath 201. In some exemplary embodiments, the side walls of the protrusions 205' and/or 205" extend tangentially from the outer surface of the sheath 201. For example, the side walls D-F and B-C, respectively, extend generally tangentially from the sheath outer surface. In such instances, the end points of the protrusion are determined by a theoretical extension of the outer contour of the sheath 201 as shown by the dashed lines in FIG. 2B.

For example, for the protrusion 205' the dashed line from A to B represents an extension of the surface of the sheath 201 between A and D. The theoretical extension contacts the outer surface of the sheath at point B, which represents the third point of the protrusion 205'. Similarly, the point D for protrusion 205" represent the point at which the line D-F intersects with the outer surface of the sheath 201, as shown.

As explained above, in exemplary embodiments of the present invention the protrusions can be triangularly shaped. In other embodiments, other overall shapes can be used, but the protrusions should have at least one edge which is capable of securing the preform 200 against a surface of a component to be brazed. In exemplary embodiments where a triangular protrusion is used, the protrusion(s) can have any type of triangular geometry which is desired for a given application. For example, the overall triangular shape of the protrusion(s) can be equilateral, isosceles, scalene, acute, obtuse, or right—depending on the application and desired geometry. For example, as shown in FIG. 2B, the protrusion 205' has a triangular shape (A-B-C) which is obtuse scalene, where the protrusion 205" (D-E-F) has a generally isosceles geometry. For reference and understanding herein, the length of the triangle side opposite the distal peak of the triangular portions is measured as a straight line between the points of the triangle that lie on the general outer surface of the sheath 201. As an example, the protrusion 205' is made up of sides A-C, C-B, and A-B where the length of A-B is a straight line between points A and B, as described herein. Similarly, protrusion 205" is made up of sides E-F, F-D and D-E, where the length of D-E is a straight line between points D and E.

In exemplary embodiments of the present invention that use at least two protrusions (more than two can be used in some embodiments), the protrusions can have the same, or different, geometries depending on the application and desired performance of the protrusions. In FIG. 2B, the protrusions 205' and 205" have different geometries.

Further, the protrusions 205'/205" can be oriented in such a way as to optimize their engagement with the components depending on the intended use of the preform 200. That is, the protrusions 205'/205" can be oriented such that the respective ends (C and F) can engage into a surface of a component to be brazed so that the preform 200 is sufficiently secured during any movement, manufacturing or assembly processes that can tend to cause a preform to be dislodged before brazing. The orientation of the protrusions 205' and 205" is further understood with reference to FIG. 2C.

As shown, each protrusion 205' and 205" has a centerline—CL' and CL", respectively. The respective centerlines are the lines which pass from the outer engagement point of the protrusion and pass through the mid-point of the side of the protrusion which is made of points of the protrusion which lie on the outer surface of the overall shape of the sheath 201. This is further understood by the examples shown in FIG. 2C. That is, the protrusion 205' has a centerline CL' which passes from the distal protrusion point C and passes through the midpoint X of the line A-B. Similarly, the protrusion 205" has a centerline CL" which passes from the distal point F through the midpoint Z of the line D-E.

As shown in FIG. 2C, the protrusions 205' and 205" can be oriented in such a way that their respective centerlines CL' and CL" do not pass through the geometric center GC of the preform cross-section. Of course, in other exemplary embodiments, the relative orientation of the protrusions is such that the engagement of the preform 200 is optimized for its given application. Thus, in some embodiments the centerline can be such that it passes through the geometric center GC of the preform.

Therefore, with the use of at least one protrusion as described herein, embodiments of the present invention improve the stability of a brazing preform within a component assembly to allow the assembly to be moved prior to brazing. Further exemplary embodiments are discussed below with regard to FIGS. 3-5.

Figure 3:
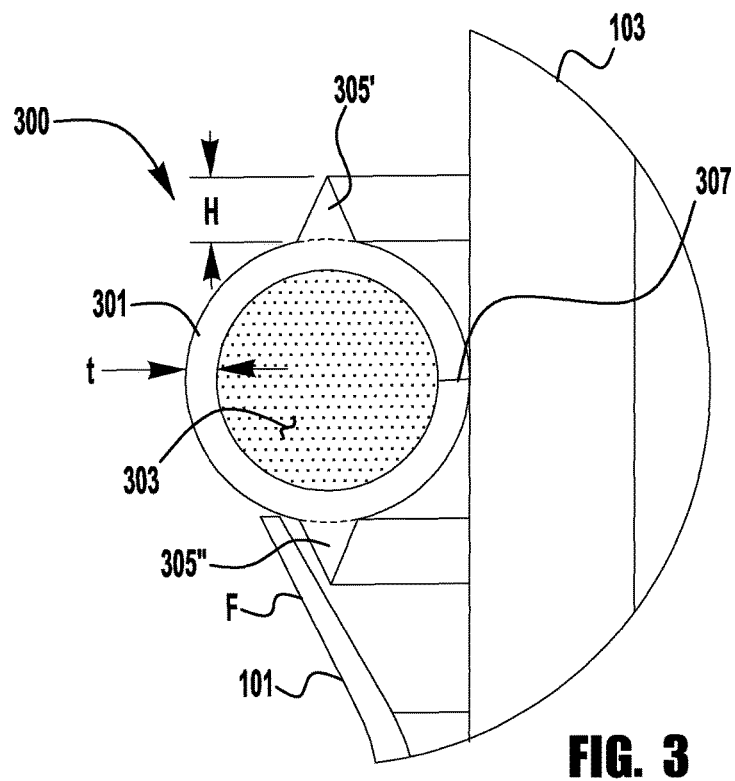
FIG. 3 is a diagrammatical representation of a cross-section of another exemplary consumable of the present invention.

FIG. 3 depicts another exemplary embodiment of a preform cross-section that can be used. The preform 300 has a sheath 301 and a flux core 303, where the sheath 301 has a seam 307 which is positioned adjacent to a component 103 to be brazed. Like the preform 200, the preform 300 has two protrusions 305' and 305" to aid in securing the preform 300. However, the protrusion 305" is configured and positioned such that it engages the flange F of the pipe portion 101, unlike in FIGS. 2A-2C. Further, in the preform 300, the protrusions 305' and 305" have the same geometry (they are both isosceles) and have the same orientation, where their respective centerlines pass through the geometric center of the cross-section of the preform 300. Additionally, the respective centerlines of the protrusions 305' and 305" are co-linear through the geometric center. In other exemplary embodiments, this may not be the case as the respective centerlines can form an angle with respect to each other. The use of multiple protrusions can aid in securing the preform 200/300 to the components, and can also be used to aid in the manufacture and/or the alignment of the preform in the component assembly.

Additionally, as shown each of the protrusions have a height H, measured radially out from the generally circular cross-sectional shape of the preform 300. In exemplary embodiments of the present invention, the height H is in the range of 25 to 125% of the thickness t of the sheath 301, as measured at a point remote from the protrusion portions 305' and 305". In other exemplary embodiments, the height H is in the range of 50 to 100%. Of course, in other exemplary embodiments of the height H of at least one of the protrusions can be larger or smaller than this range, depending on the desired geometry for the intended application. Further, in the embodiment shown, each of the protrusions 305' and 305" have the same height H, whereas in other embodiments, the height H of the respective protrusions can be different.

Figure 4:
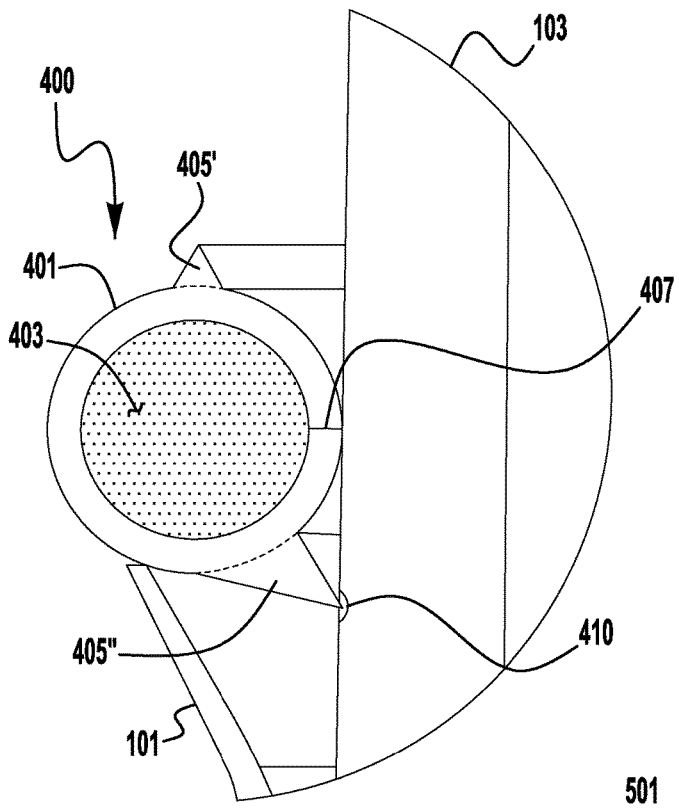
FIG. 4 is a diagrammatical representation of a cross-section of a further exemplary consumable of the present invention.

FIG. 4 depicts another cross-section of an exemplary embodiment of the present invention. Again, the preform 400 has two protrusions 405' and 405", which have a different shape and orientation. The protrusion 405' is similar to the protrusion 305' shown in FIG. 3, while the protrusion 405" is similar to the protrusion 205" shown in FIGS. 2A-2C. Further, as shown in FIG. 4, at least one of the protrusions 405" can have a shape and configuration such that its distal end engages with a recession or groove 410 in a component 103 to be brazed. That is, at least one of the components 101/103 of the assembly 100 has a preform retention groove 410 along its surface such that a protrusion from the preform 400 can engage with the groove and thus aid in holding the preform 400 in place.

Figure 5:
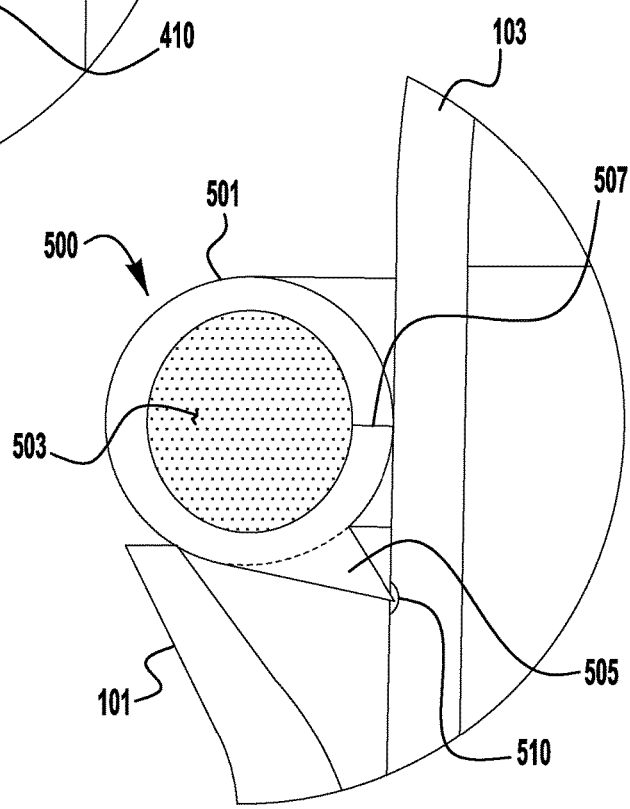
FIG. 5 is a diagrammatical representation of a cross-section of an additional exemplary consumable of the present invention.

FIG. 5 depicts another exemplary embodiment of the present invention. Again, the preform 500 has a sheath 501, flux core 503 and seam 507. In this embodiment, the preform 500 has only a single protrusion 505. The protrusion is similar to the protrusion 205" shown in FIGS. 2A-2C. Additionally, the distal end of the protrusion 505 engages with a grooves 510 in the component 103 to aid in holding the preform in place prior to brazing.

As shown in the embodiments of FIGS. 2A through 5, the protrusion portions are shaped such that their respective distal ends (peaks) of the protrusion portion(s) are outside of the diameter of an imaginary circle which would match with the largest outer diameter of the circular portion of the cross-section of the consumable. For example, as shown in FIG. 2C, each of the distal end points C and F are located such that they would be outside of the diameter of an imaginary circle matched to the largest outer circular diameter of the sheath 201. Stated differently, in exemplary embodiments of the present invention, the radial distance from outermost edge of the largest diameter circular portion of the cross-section to the center of the circular portion will be less than the distance from the center of that circular portion to the distal end points. This is also shown in each of FIGS. 3 through 5, where the dashed lines shown next to the protrusion portions represent the largest diameter circle that would match the outer circular diameter of the consumable, and as shown, the protrusion portions are shaped such that their distal ends are outside of this circle.

Thus, as shown above, there are many variations to exemplary of the present invention. With these embodiments, engagement and retention of a brazing preform is increased over known flux cored brazing consumables.

The manufacture of preforms in accordance with embodiments of the present invention can be done with known methods and processes. For example, the sheath can be made by extruding or drawing the sheath material through a series of dies which provide the desired shape of the sheath. In exemplary processes the sheath is formed such that it's inner surface can be U or C shaped to allow for the insertion of the flux core into the opening of the sheath. Upon insertion of the flux cored the sheath is then closed around the core to hold the flux in place. As explained previously, the seam, which is created by the ends of the sheath, can be formed such that the ends are in contact with each other, or such that a small gap is present at the seam. Upon completion of this process, the brazing consumable can be made into the desired final shape. For example, the brazing consumable can be left as a straight rod-type consumable, it can be wound onto reels, spools, or the like, or can be formed into a preform shape as generally discussed herein. That is, lengths of the consumable can be formed into a desired shape (such as a ring shape) to be used for whatever intended use.

As with known brazing consumables, during use the brazing consumable and at least some of the components to be brazed are heated by either a direct flame or in an oven type environment. During the heating process the flux core begins to melt and will escape from the core through the seam such that the liquefied flux will flow into the joint of the components to be joined. As the heating continues at least some of the flux begins to vaporize and the sheath begins to melt, where the liquefied sheath is drawn into the joints via capillary action from the vaporization of the flux.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A brazing consumable, comprising:
a flux core, and
a hollow metallic sheath which surrounds said flux core such that said metallic sheath has a longitudinally-extending seam extending between an interior surface and an exterior surface of said sheath through which at least some of said flux core passes when said brazing consumable is heated;
wherein said sheath has said exterior surface configured such that said consumable has a cross-sectional shape which is generally circular for a portion of a perimeter of said cross-sectional shape,
wherein said exterior surface has a first protrusion, having a triangular cross-sectional shape with respect to a longitudinal axis of said consumable, and a second protrusion having a different triangular cross-sectional shape than said first protrusion, wherein said first protrusion and said second protrusion extend outward from said exterior surface, and wherein said seam is located between said first protrusion and said second protrusion,
wherein said first protrusion and said second protrusion have respective distal edges that extend away from said exterior surface to engage a work piece to be brazed, so as to provide a gap between the seam and the work piece,
wherein respective centerlines of said first protrusion and said second protrusion do not pass through a cross-sectional geometric center of said consumable, and
wherein each of said first protrusion and said second protrusion have a respective side wall that extends generally tangentially from said exterior surface of said sheath.

2. The brazing consumable of claim 1, wherein said respective distal edges are distal endpoints of said triangular cross-sectional shape and said different triangular cross-sectional shape.

3. The brazing consumable of claim 1, wherein at least 50% of the perimeter of said exterior surface is generally circular.

4. The brazing consumable of claim 1, wherein said first protrusion has a height which is in the range of 25 to 125% of the thickness of the sheath as measured at a point remote from said first protrusion.

5. The brazing consumable of claim 1, wherein said second protrusion is positioned on said exterior surface opposite from said first protrusion.

6. The brazing consumable of claim 1, wherein said exterior surface is generally flat between said first protrusion and said second protrusion.

7. A brazing consumable, comprising:
a flux core, and
a hollow metallic sheath which surrounds said flux core such that said metallic sheath has a longitudinally-extending seam extending between an interior surface and an exterior surface of said sheath through which at least some of said flux core passes when said brazing consumable is heated;
wherein said sheath has said exterior surface configured such that said consumable has a cross-sectional shape which is generally circular for a portion of a perimeter of said cross-sectional shape,
wherein said exterior surface has a first protrusion, having a triangular cross-sectional shape with respect to a longitudinal axis of said consumable, and a second protrusion having a different triangular cross-sectional shape than said first protrusion, wherein said first protrusion and said second protrusion extend outward from said exterior surface to engage a work piece to be brazed so as to provide a gap between the seam and the work piece, and wherein said first protrusion and said second protrusion have respective distal edges which are located outside of an imaginary circle which has a radius and centerpoint which is the same as a maximum radius and centerpoint of said generally circular portion of said sheath,
wherein said seam is located between said first protrusion and said second protrusion,
wherein respective centerlines of said first protrusion and said second protrusion do not pass through a cross-sectional geometric center of said consumable, and
wherein each of said first protrusion and said second protrusion have a respective side wall that extends generally tangentially from said exterior surface of said sheath.

8. The brazing consumable of claim 7, wherein at least 50% of the perimeter of said exterior surface is generally circular.

9. The brazing consumable of claim 7, wherein said first protrusion has a height which is in the range of 25 to 125% of the thickness of the sheath as measured at a point remote from said first protrusion.

10. The brazing consumable of claim 7, wherein said second protrusion is positioned on said exterior surface opposite from said first protrusion.

11. The brazing consumable of claim 7, wherein said exterior surface is generally flat between said first protrusion and said second protrusion.

12. The brazing consumable of claim 7, wherein said first protrusion is positioned remotely from said seam along said exterior surface of said sheath.

13. A brazing preform assembly, comprising:
a work piece to be brazed having an outer cross-sectional shape; and
a brazing consumable, where said brazing consumable comprises:
a flux core, and
a hollow metallic sheath which surrounds said flux core such that said metallic sheath has a longitudinally-extending seam extending between an interior surface and an exterior surface of said sheath through which at least some of said flux core passes when said brazing consumable is heated;
wherein said sheath has said exterior surface configured such that said consumable has a cross-sectional shape which is generally circular for a portion of a perimeter of said cross-sectional shape,
wherein said exterior surface has a first protrusion, having a triangular cross-sectional shape with respect to a longitudinal axis of said consumable, and a second protrusion having a different triangular cross-sectional shape than said first protrusion, wherein said first protrusion and said second protrusion extend outward from said exterior surface to engage the work piece to be brazed so as to provide a gap between the seam and the work piece, and wherein said first protrusion and said second protrusion have respective distal edges which are located outside of an imaginary circle which has a radius and centerpoint which is the same as a maximum radius and centerpoint of said generally circular portion of said sheath;
wherein said seam is located between said first protrusion and said second protrusion,
wherein respective centerlines of said first protrusion and said second protrusion do not pass through a cross-sectional geometric center of said consumable,
wherein each of said first protrusion and said second protrusion have a respective side wall that extends generally tangentially from said exterior surface of said sheath, and
wherein said brazing consumable is shaped to couple said brazing consumable to said outer cross-sectional shape of said work piece and secure said brazing consumable to said work piece.

14. The brazing preform assembly of claim 13, wherein said brazing consumable is shaped such that said seam is positioned facing a surface of said workpiece.

15. The brazing preform assembly of claim 13, wherein said exterior surface is generally flat between said first protrusion and said second protrusion.

* * * * *